United States Patent Office 3,718,808
Patented Feb. 27, 1973

3,718,808
APPARATUS FOR TIME-DEPENDING EVALUATION OF A DIAGRAM CARRIER
Heinz Kelch, Buchenberg, and Siegfried Spauszus, Villingen, Germany, assignors to Kienzle Apparate G.m.b.H., Villingen, Germany
Filed Feb. 22, 1972, Ser. No. 227,738
Claims priority, application Germany, Feb. 19, 1971, P 21 07 976.5
Int. Cl. G06k 11/00
U.S. Cl. 235—92 T
21 Claims

ABSTRACT OF THE DISCLOSURE

An apparatus for evaluating at least one recording on a rotary diagram carrier which has a starting mark and is sensed by scanning means distinguishing different sections of the recording, and producing a start signal when sensing the start mark. A pulse generator generates time pulses which are counted by a time counter producing an end signal when a predetermined number of time pulses, corresponding to 24, or 12 hours, for example, is counted. While sensing the different sections of the recording, the scanning means transmit different signals representing the respective sections of the recording, to distributing gates which permit the passage of corresponding numbers of time pulses to different storage counters which are separately read out when the end signal is produced after 24, or 12 hours, for example.

BACKGROUND OF THE INVENTION

The present invention relates to apparatus for time-depending automatic evaluation of recordings on a diagram carrier.

It is known to use automatically made recordings for monitoring the technical functions of apparatus by means of graphical recordings. For example, the consumption of fuel, and the required power can be graphically recorded. In this manner, the efficiency of a machine can be checked. In manufacturing operations, the output of semi-finished parts, or finished parts and the times required for setting up the machines for operation, are recorded in order to obtain clear information about an efficient utilization of the machine. Vehicles are supervised by tachographs, which graphically record in separate recordings, the varying speed of the vehicle, the distance travelled, the number of revolutions of the engine, parking time periods of the vehicle, and the driving times or working times of the driver. Several recording instruments simultaneously produce graphs representing different variable data on the same diagram carrier, which may be a paper disc. The graphical recordings on the diagram disc are consequently an important information permitting the monitoring of operations, as well as planning. Evidently, it is not enough to make the recording, but such recordings must be evaluated, preferably by automatic apparatus.

For example, a tachographic diagram carrier has at the end of a day, a plurality of recordings. The recording representing speed variations contains information regarding the manner in which the driver accelerates and decelerates the vehicle, and the supervisor of the driver can check whether the maximum speed is observed, and also whether the driver operates the car carefully to save extreme wear of the engine by racing the engine instead of operating the vehicle at a substantially uniform speed. If two drivers alternate in driving the car, a recording on the diagram carrier indicates which driver operated during which time periods, and whether the respective driver operated the car properly or improperly, which appears from the part of the speed recording associated with the recording for the respective driver.

Another recording may be produced by oscillating recording means forming a zigzag line, portions of which have different amplitude and appearing on the record carrier disc as beams of different width. Such a recording contains information about the length of the time during which the car was stopped, about the time periods when the engine was running while the car was parked, and the time periods during which the car was driven, or may indicate which driver drove the car during which time periods. It is possible to interpret the recordings on a diagram carrier of a tachograph visually, but such operations require not only great experience, but are very time-consuming. Nevertheless, the visual evaluation depends on the accuracy of the evaluating person, and is not free of errors. Particularly, if a great number of vehicles is to be supervised, as may be the case in a public bus line, the visual interpretation causes difficulties, particularly if the vehicles have to be operated day and night. Automatic evaluation apparatus has been proposed which is capable of storing the results of the evaluation in storage counters. As long as a diagram carrier has only one recording, representing, for example, consumption of electric power, the automatic evaluation is comparatively simple. However, if several different recordings representing different operations in data are recorded on one diagram carrier, even the differentiation between several recordings, which are to be read out, is difficult.

An automatic evaluation apparatus for several recordings is disclosed in the German Offenlegungsschrift 1,499,-399. This apparatus is capable of recognizing beam zigzag recordings of different width, the respective information being stored in a storage counter respectively associated with the respective width of the recording. The time periods for the sections of the recording which are of different width, are totalized in a correlated storage counter.

Another evaluation apparatus is disclosed in the German patent application P 1,524,450 which is capable of recognizing beam recordings of different width, and of transmitting the respective information to a correlated storage counter. The information stored in the respective storage counters, can then be read out and printed out by a tabulating machine.

The German Offenlegungsschrift 1,921,456 discloses an automatic evaluation apparatus which is capable of evaluating a plurality of recordings in tracks of a diagram carrier, and can distinguish between three possible widths, and positions, of a beam recording. In accordance with this publication, machine tools are supervised by reading, totalizing, and printing out information regarding time periods and number of manufactured pieces from the recordings on the diagram carrier.

Evaluation apparatus in accordance with the prior art have the disadvantage that the data resulting from the evaluation of graphical recordings, can only be interpreted without any fixed relation to the time of the day. The recordings made on the diagram carrier are usually depending on time, since the diagram carrier may be rotated one revolution during a day, while the recording implement performs radial movements. However, the apparatus according to the prior art has no means for recognizing the time of the day at which work starts or ends, for example, and the read out data have no relation to the time of the day. This is particularly undesirable since, for example, a diagram carrier for recording the operations of the vehicle, is secured in the apparatus on a supporting table in a position related to the time so that all recordings depend on time.

The evaluation apparatus according to the prior art, starts the evaluation only at the beginning of a recording, but not at the beginning of the rotation of the diagram carrier. Consequently, in accordance with the prior art time periods are determined and printed out, but it is not known in which relationship the time periods are to the time of the day. Therefore, the apparatus of the prior are is incapable of determining and printing out at what time a driver started his work and terminated it, although the time during which he was operating the car is known.

SUMMARY OF THE INVENTION

It is one object of the invention to overcome this disadvantage of known automatic evaluation apparatus for graphical recordings, and to provide an automatic evaluation apparatus in which determined time periods are related to the time of the day.

Another object of the invention is to automatically evaluate a diagram carrier during a predetermined time period, for example 12 hours or 24 hours, irrespective of the fact that actual operations as expressed by recordings started after the beginning of this time period, and ended before the end of the time period.

Another object of the invention is to scan a track having a recording during a predetermined time period, and to read out and print out the times of the day at which the recorded operations started and ended.

With these objects in view, in accordance with the invention, a special start mark is provided on the diagram carrier so that the scanning means produce a start signal when passing the start mark. The start signal accomplishes that time pulses, derived from the drive motor of the diagram carrier, are transmitted to a time counter and to an evaluation device, while, under the control of the scanning means, the time pulses are transmitted to storage counters which totalize the time pulses representing different sections of a scanned recording.

The start mark is preferably arranged on the diagram carrier in a position selected in accordance with the time of the day.

The novel features which are considered as characteristic for the invention are set forth in particular in the appended claims. The invention itself, however, both as to its construction and its method of operation, together with additional objects and advantages thereof, will be best understood from the following description of specific embodiments when read in connection with the accompanying drawing.

DESCRIPTION OF THE PREFERRED EMBODIMENTS

Figure 1:
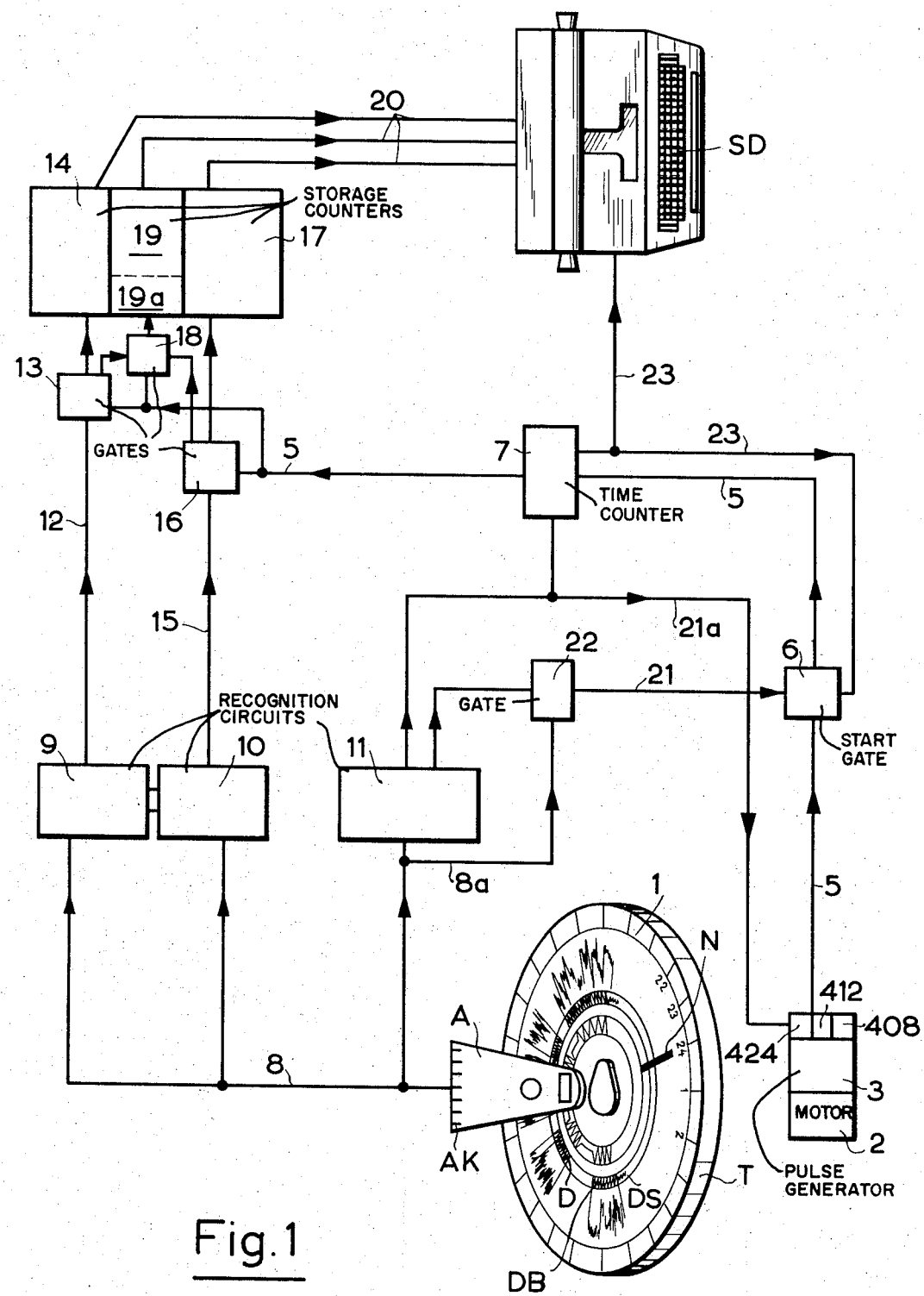
FIG. 1 is a schematic diagram, and partially perspective fragmentary view, illustrating an embodiment of the invention.

Referring first to FIG. 1, a diagram carrier in the form of a circular disc or chart is fixedly attached to a rotary support T which is rotated at constant speed by an electric motor 2 so between angular positions. The diagram carrier 1 has a scanning station A which, in the illustrated example, is stationary, but adjustable so that it can be used for sensing any selected circular track of the diagram carrier 1. In the illustrated example, one revolution of support T and of the diagram carrier 1 is carried out in 24 hours, as indicated by graduations in the peripheral portion of the diagram carrier 1. The clock motor 2 also drives a pulse generator 3 which is constructed to generate 7,200 pulses during one revolution of the diagram carrier, and since in the illustrated embodiment one revolution is carried out in 24 hours, the pulse generator 3 generates five pulses for each minute.

It is necessary to assure that the same number of five pulses is produced by pulse generator 3 during each minute, even if a diagram carrier is used which performs one revolutiion in 12 hours, or even in 8 hours. For this purpose, pulse generator 3 is constructed to simultaneously generate several series of pulses at different frequencies. For selecting the desired frequency three selector gates 424, 412, and 408 are provided, one of which is opened to permit passage of pulses of the desired frequency, depending on the time period for which the used diagram carrier 1 is designed. Other selector gates may be provided for cooperation with other diagram carriers designed to perform one revolution in another time period.

In the illustrated embodiment, the time period of 24 hours is required for one revolution of the diagram carrier 1 so that gate 424 is open and pulses pass through the conductor 5 to a starting gate 6 which serves the purpose to permit passage of time pulses from pulse generator 3 only from a predetermined moment on at which a start signal is received from conductor 21 by the starting gate 6.

For a 24 hour diagram carrier 1, the evaluation of the recordings is to start at zero hours, so that any scanned portion of a recording on the diagram carrier can be related at any point to the actual clock time.

A time counter 7 is provided in conductor 5 which adds and totals all time pulses transmitted from pulse generator 3 for the purpose of controlling the times of evaluation, and for controlling several operations required for the evaluation of a recording, for example the termination of the evaluation, the shifting of the scanning means A to a different recording on another track of the diagram carrier, the interrogation of a storage counter 14, 19, 17, and the print-out of the contents of the storage counters by a tabulating apparatus SD. Time counter 7 is constructed so that it can be set to a predetermined number of time pulses, which corresponds to the time period for which the diagram carrier 1 is designed to perform one revolution. Since, as noted above, pulse generator 3 produces five pulses for each minute which are transmitted from gate 424, time counter 7 is set to stop counting after 7,200 pulses received from pulse generator 3. In a conventional manner, the preset time counter 7 produces after 7,200 pulses, an end signal which is used for the purposes explained above. Particularly, the end signal is transmitted from time counter 7 through conductor 23 to a read-out tabulating apparatus SD which performs an operation by which the storage counters 14, 19, and 17, whose purpose will be explained later, are read out and printed out. Evidently, if a diagram carrier 1 is used which is designed for 12 hours, time counter 7 is set to produce the end signal after receiving 3,600 time pulses from pulse generator 3.

It will be understood that several recordings, made along concentric tracks of diagram carrier 1 during rotation of the same by recording means, not shown, can be selectively read out by the scanning means A. However, for the sake of simplicity, it will be assumed that only a single recording, namely a beam recording D is to be read out by the scanning means. Beam recordings of this type are made by radially vibrating recording means during uniform rotation of the diagram carrier, and since the recorded zigzag lines are densely arranged, they appear as beams. The amplitude of the vibrations of the recording means is varied in accordance with different operational conditions so that the illustrated beam recording D has a narrow section DS and a wide section DB. Before vibration of the recording instrument started, the recording instrument makes a circular line so that the recording D has distinguishable different section DS, DB, and the circular line may be considered to be also a distinguishable section of the recording. The circumferential length of each section DS, DB, and of the recorded circular line, represents different time periods during which different operational conditions prevail. For example, the narrow beam section DS is recorded while the motor is running and the vehicle is at a standstill, and the wide beam section DB is recorded during movement of the car. While the car is at a standstill, and the engine is switched off, the recording means, not shown, which is at a standstill, draws the above-explained circular line whose circumferential length represents the time during which the car was parked.

A schematically shown scanning means A is assumed to be positioned to read out the recording D. The scanning means A has eight sensing means AK, preferably photodiodes arranged in a row. If the photodiodes directly sense the respective recording D, the row must be arranged perpendicularly to the circumferential direction of movement of the recording D, but in the illustrated example, optical means O, including magnifying lenses, project an enlarged image of the recorded beam D to the row of photodiodes AK, so that the accuracy of the evaluation of the beam recording D is improved.

It will be understood that a narrow beam section DS excites a smaller number of diodes AK, than a wide beam section DB. A recognition circuit 9 is provided for the narrow beam section DS, and the recognition circuit 10 is provided for the wide beam section DB. The recognition circuit 9 has gates, not shown, which are connected in a gate circuit which transmits a recognition signal through conductor 12 to a gate 13 which is part of distributing gate means 13, 16, and 18. The photodiodes AK are spaced such a distance that three photodiodes are excited by a narrow beam section, and five photodiodes AK are excited by a wide beam section. In the same manner in which a recognition signal is transmitted by the recognition circuit 9, a recognition signal for the wide beam sections is transmitted by recognition circuit 10 to the gate 16. Since the excitement of three photodiodes is required for producing a recognition signal in recognition circuit 9, the circumferentially extending line recorded by the recording means while the car was at a standstill and the motor not running, is not recognized by recognition circuits 9 and 10.

Assuming that recognition circuit 9 has recognized a narrow beam section DS by excitation of three adjacent diodes AK, the recognition signal transmitted through conductor 12 opens the gate 13 which is also connected with conductor 5 through which it receives time pulses from pulse generator 3 and time counter 7. When gate 13 opens, the time pulses are transmitted to the storage counter 14, which is associated with the narrow beam sections, and counted in the same. Consequently, the total of pulses counted in storage counter 14 represents the total circumferential length of the narrow beam sections DS, and consequently also the time periods during which the car was at a standstill with the motor running. When after 7,200 pulses, the time counter blocks further transmission of time pulses to gate 13 and storage counter 14, no further pulses are stored in storage counter 14.

When a wide beam section D, B is recognized by recognition circuit 10 due to the fact that five photodiodes DA are excited, so that the recognition signal through conductor 15 opens gate 16, time pulses from conductor 5 and pulse generator 3 now enter the storage counter 17, which is associated with the wide beam section DB. The number of pulses stored in storage counter 17 before time counter 7 stops the transmission of time pulses, corresponds to the total circumferential length of wide beam section DB scanned by the row of photodiodes AK.

If photodiodes AK do not respond to a narrow beam section DS or to a wide beam section DB, gates 13 and 16 are closed.

The distributing gates 13 and 16 are both connected with a gate 18 which is connected with a third storage counter 19, which is preferably provided with the preliminary counter 19a. Gate 18 is also connected with conductor 5 to receive time pulses until the time counter 7 has counted the pulses to the predetermined number of 7,200 pulses.

When both gates 13 and 16 are closed, corresponding to no wide or narrow beam sections being scanned, gate 18 opens and pulses enter storage counter 19 so that the number of time pulses stored in storage counter 19 from the opening of the starting gate 6 to the closing of time counter 7, corresponds to scanned sections of the circular track of the beam recording D in which neither a wide, nor a narrow beam section is located, but in which the above-explained circumferential line may have been drawn by the recording means of the recording D.

When time counter 7 blocks further transmission of time pulses to the distributing gate means 13, 16, 18 after counting the predetermined number of time pulses, time counter 7 produces an end signal 23 which is transmitted to the tabulating apparatus SZ for effecting a read-out of all three storage counters 14, 17, and 19 through lines 20. The numbers in storage counters 14, 17 and 19 are then printed in corresponding columns of a form.

The specific construction of the above-described recognition circuit is not an object of the present invention, but has been explained for a better understanding of the invention.

Figure 3:
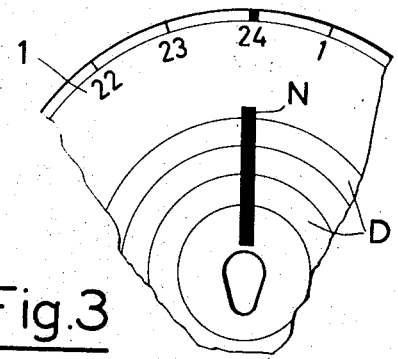
FIGS. 3, 4 and 5 are fragmentary views illustrating different start marks which may be used on the diagram carriers evaluated by the apparatus of the invention.

Any used diagram carrier 1 is provided with a start mark N, shown in FIG. 1 to be a radially extending line marking the graduation between 24 hours and zero hours. The radial line N is black, and has one lateral boundary located in a radial line passing through the graduation 24, as best seen in FIG. 3. Start mark N has such a radial length as to cross several circular concentric tracks on diagram carrier 1, including the track in which the beam recording D was made.

Figure 2A:
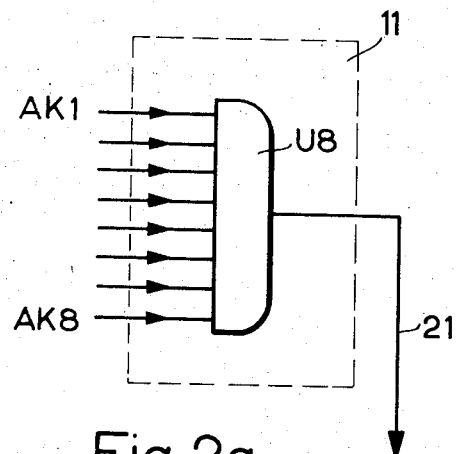
FIG. 2a and FIG. 2b are schematic diagrams illustrating two modifications of the apparatus of FIG. 1.
Figure 2B:
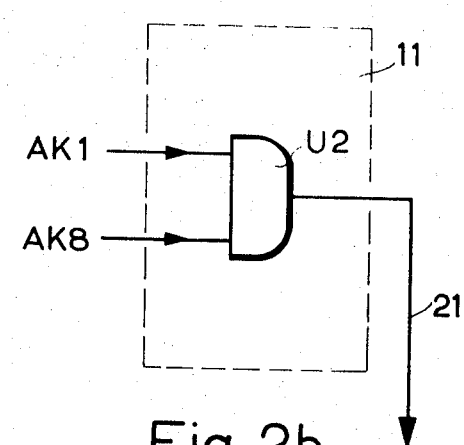

The start mark N is long enough to cross the outermost diodes Ak1 and Ak8, as shown in FIG. 2a and FIG. 2b. As shown in FIG. 2a, all photodiodes Ak are connected with an AND gate U8, and produce a start signal when all photodiodes Ak are excited. In accordance with FIG. 2b, an AND gate U2 is connected only to the two outermost photodiodes Ak1 and Ak8, and produces a start signal when both outermost photodiodes are excited by the start mark N. The gate circuits shown in FIG. 2a and FIG. 2b can be provided in the start recognition circuit 11 in FIG. 1, and the start signal is transmitted from recognition circuit 11 through a gate 22 and a conductor 21 to the starting gate to open the same. Consequently, irrespective of the generation of pulses by pulse generator 3, the starting gate 6 prevents transmission of pulses to the time counter 7 and to the distributing gates and storage counters until the start signal has been received by gate 6, indicating that the zero point of the time scale of the diagram carrier 1 has passed the scanning means A, and has been recognized by recognition circuit 11. Since the time counter 7 blocks the time pulses after counting the number of 7,200 which corresponds to the time pulses generated during a full revolution of the diagram carrier 1 for 24 hours, the totals stored in storage counters 14, 19 and 17 add up to 7,200, when they are read out and printed after one revolution of the diagram carrier 1.

Figure 4:
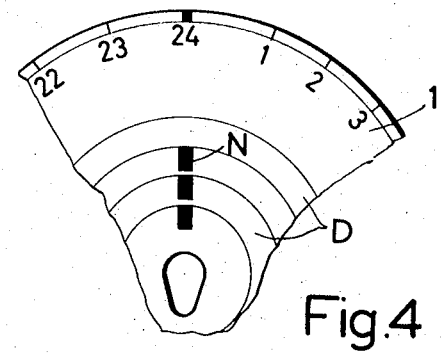
Figure 5:
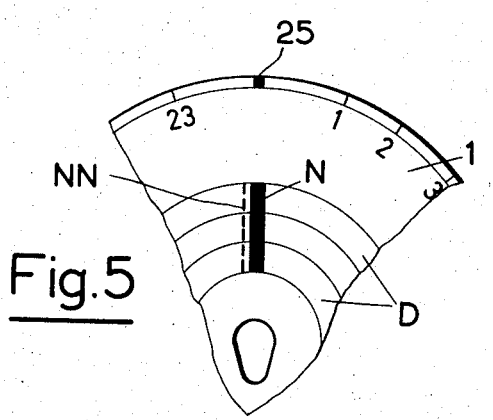

The recognition circuit shown in FIG. 2b has the advantage over the recognition circuit shown in FIG. 2a, that only two diodes are required, so that further signals can be transmitted at the starting moment by start marks N of special configuration, for example, as shown in FIG. 4 where the photodiodes A$k$ between the outermost photodiodes A$k$1 and A$k$8 may be excited by intermediate portions of the start mark. A signal produced by the intermediate photodiodes, reading out the interrupted start mark shown in FIG. 4, may be used for setting the entire apparatus to a specific type of diagram carrier 1, which may perform a complete revolution during 12 hours, for example by setting the time counter 7 to close after counting 3,600 pulses. In the modified diagram carrier 1 shown in FIG. 5, the start mark N remains a dark radial line, as shown in FIG. 3, but an additional radial coded line NN is provided which is sensed by the photodiodes to provide a signal setting the apparatus to a particular diagram carrier by opening a specific selector gate, for example gate 412, if the time counter is set to a total of 3,600, and the diagram carrier 1 rotates one revolution during 12 hours.

Due to the fact that the mark NN precedes the start mark N, the respective signal effects the section of the proper selector gate 412, and sets the time counter to 3,600 pulses, for example, before the start signal produced by start mark N opens the starting gate 6.

A gate 22 is provided in conductor 21 between the recognition circuit 11 and the starting gate 6, and is constructed to remain open for a predetermined time period. When the scanning means A passes from the light diagram carrier 1 to the dark start mark N, a signal is produced which passes through conductor 8$a$ to the time limit gate 22, and opens the same. Gate 22 is a monostable multivibrator, and switches after a predetermined time, for example three minutes on record carrier 1, so that gate 22 again closes. This means that the start mark N must be narrower than the angle of the diagram carrier 1 corresponding to three minutes. Consequently, after opening of the time limit gate 21, and when the scanning means passes from the dark start mark N to the light surface of the diagram carrier 1, the signal transmitted on conductor 21 can pass through the gate 22 and open gate 6. The provision of the time limit gate 22 is necessary to avoid that scratches in the diagram carrier 1, or accidental dark spots are recognized erroneously as start mark N whereby a wrong evaluation of the diagram carrier 1 would be started.

The evaluation of a recorded beam diagram is carried out as follows: The diagram carrier 1 is placed on the rotary support T, and is automatically secured to the same by a device, which is not an object of the invention. Since the clock motor 2 rotates continuously, the rotary support T also rotates at a constant speed with diagram carrier 1. During a part of the first revolution, the start mark N passes the scanning means A. The transition from the light diagram carrier 1 to the dark start mark N produces a first signal in conductor 8 which opens time limit gate 22. When the start mark N moves out of the alignment with scanning means A, a second signal is produced by the outermost diodes A$k$ which is transmitted through conductor 8 to the recognition circuit 11, shown best in FIGS. 2$a$ and 2$b$, which transmits a start signal through conductor 21 through time limit gate 22 to starting gate 6, provided that the sensed start mark N had the required width. Gate 6 opens, so that the time pulses continuously produced by generator 3 driven by motor 2, are transmitted to time counter 7 and from there to the distributing gate means 13, 16 and 18. If the diagram carrier 1 is designed for 24 hours, the start mark N is provided at the zero graduation so that the time pulses from pulse generator 3 arrive at the distributing gate means from the moment on in which the start mark N is sensed by the scanning means A whereby the storing of time pulses in the storage counters 14, 19 and 17 is started at 12 o'clock p.m. Since the time counter 7 closes after 7,200 pulses, the transmission of time pulses to storage counters 14, 19 and 17 stops at 24 hours at which the entire circular track of the beam recording D was sensed and evaluated.

As explained above, while the car was at a standstill and the motor not running, the respective corded circular track contains neither a narrow beam nor a wide beam recording, but a line made by the recording means without oscillation. This line is not recognized by the scanning station A, since it is narrower than the group of three photodiodes A$k$ required for recognizing a narrow beam section DS, so that neither recognition circuit 9, nor recognition circuit 10 produces a recognition signal for opening the respective gates 13 and 16. Since gate 18 opens when both gates 13 and 16 remain closed, the time pulses from pulse generator 3 enter storage counter 19.

During further rotation of the diagram carrier 1, a narrow beam section DS arrives under the scanning means A, representing the starting of the engine of the car which, however, does not yet move. The signal produced by three photodiodes A$k$ is recognized by the recognition circuit 9 so that gate 13 opens to permit the passage of time pulses into the storage counter 14, while gate 18 automatically closes so that no time pulses are stored in storage counter 19. The signal by which gate 18 is closed and gate 13 is opened is preferably used for controlling the readout means of the tabulating machine SD to interrogate storage counter 19 and to print the respective clock time. In this manner, the beginning of the use of the car is entered in accordance with the clock time on the form, whereupon storage counter 19 is cleared.

During the further scanning of the circular track of beam recording D, the time periods during which the car was stopped on the respective day, and if desired, also the number of stopped time periods are determined by means of storage counter 19. At the beginning of the daily drive, the tachographic recording means records a wide beam section DB which upon scanning is recognized by recognition circuit 10 responding to five excited photodiodes A$k$ so that a signal transmitted through conductor 15 opens gate 16, while the recognition circuit 9 closes gate 13. The following time pulses on conductor 5 are entered into the storage counter 17 as long as a wide beam section DB passes the scanning station A so that storage counter 17 totalizes the time periods during which the car was moving on the particular day. Stopping times, during which the car was at a standstill and the motor switched off, may occur during the loading and unloading, or lunchtime of the driver, and are recorded only in the form of a thin line which cannot excite at least three photodiodes so that the recognition circuits 13 and 16 remain closed, and gate 18 opens automatically so that such parking times are totalized on the storage counter 19.

When the car is stopped in the evening, the last narrow beam section DS ends, so that gate 18 opens, and remains open, until time counter 7 closes gate 6 upon arrival of the last of 7,200 pulses, which indicate the passage of 24 hours. The last pulse produces an end signal which is transmitted through conductor 23 to gate 6 and to tabulating apparatus SD which is started to separately print out the time periods stored in storage counters 14, 17 and 19, respectively. Since the tabulating machine SD printed right at the beginning of the operations the time of the day, the entire time of operation of the car can be calculated by totalizing the time periods stored in storage counters 14, 19 and 17, if the time from the end of the last narrow beam section DS to the closing of gate 6 by counter 7 is not totalized in storage counter 19, and not printed. This can be obtained by providing counter 19 with a main counter and a preliminary counter 19$a$. The time pulses passing through gate 18 are stored in the preliminary counter 19$a$ until the gate 18 closes again whereupon the subtotal stored in storage counter 19$a$ is stored in the main counter 19. At the same time of the transfer of the subtotal from the preliminary counter 19$a$ to the main counter 19, another counter, not shown, is shifted one unit for the purpose of adding the number of parking periods.

Since, after the car has been stopped after the end of a narrow or wide beam section, no further beams can be sensed until the evaluation is terminated by closing gate 6, the gate 18 is not closed any more so that the last arriving time pulses from the stopping of the car to the end of the evaluation at 24 hours, are not transferred to the main counter 19. Consequently, main counter 19 contains only the stopping time periods between the start of the vehicle and the final stopping of the same. Consequently, the actual time of operation of the car can be found by totalizing the contents of counters 14, 17 and 19, and correspondingly printed.

In the above-explained operation, all data of a recording D are evaluated, totalized, and printed out during one revolution of the diagram carrier.

In another embodiment, not shown, only a time counter follows the recognition circuits 9 and 10, and the evaluation is carried out by turning the diagram carrier one revolution for each part evaluation. For example, during the first revolution of the diagram carrier, the time of the beginning of the work is printed out by counting in the time counter the time pulses occurring between the recognition of the start mark N, and the beginning of the first narrow beam section DS. The respective counted pulses are totalized as hours and minutes, read out by the tabulating apparatus SD, and printed out. During a second revolution, the end of the working period is determined in the same manner, and printed out. During the third revolution of the diagram carrier, the start of driving the car is determined and printed out as clock time. During the fourth revolution, the end of the driving is also printed out as clock time, during the fifth revolution the entire working time is determined and printed out, during the sixth revolution the driving time only, and during the seventh revolution the number of stops between beginning and end of the work is printed out. The disadvantage of the required great number of revolutions for reading out one diagram carrier, is compensated by a saving in a number of pulse counters. The start of each evaluation is determined by the start mark N, while the time counter 7 effects the end of evaluation during a revolution, and the start of the tabulating apparatus.

It should be noted that the scanning station A need not be constructed as expalined above, and a scanning station as described in the German OS 1,499,399 may also be used. In a scanning station of this type, a read out point travels at a suitable frequency transversely to the direction of movement of the diagram carrier 1 across the recording D. Following gates, which use the respective width during traversing the recording for recognizing the width of the scanned recording, shift corresponding gates which transmit time signals associated with the scanned width to corresponding storage counters. In addition to the construction explained in the above publication, a circuit would have to be provided for recognizing the extreme length of the start mark N in relation to its width. Since the length of the start mark N in radial direction is substantially greater than the greatest width of a beam recording, the recognition of the start mark by means of its radial length would not cause any difficulties. It is apparent that also the additional informations, which are provided by special start marks N, or which are provided as an additional line NN can be scanned by means of a moving scanning point.

In the modified start mark shown in FIG. 4, in which the start mark N consists of several dark parts separated by light surface portions of the diagram carrier 1, six or seven photodiodes A$k$ will recognize the start mark as dark, and the eighth diode will recognize "light." In this manner, an additional signal can be obtained from the scanning station A for automatically setting the evaluation apparatus for use with a 24 hour diagram carrier 1, while for other diagram carriers which perform one revolution during a different number of hours, the parts of the start mark must be differently arranged so that a different combination of photodiodes A$k$ is excited.

As noted above, the additional mark NN in FIG. 5 sets the apparatus for operation with different diagram carriers before the start signal caused by start mark N opens the gate 6. If the scanning station A is not to be used for producing the starting signal, a start mark 25 may be provided in the peripheral portion of the diagram carrier as shown at 25 in FIG. 5, and a special sensing means is provided for sensing the start mark 25 and for producing a corresponding start signal, as explained above.

It will be understood that each of the elements described above, or two or more together, may also find a useful application in other types of apparatus for automatically evaluating recordings differing from the types described above.

While the invention has been illustrated and described as embodied in an apparatus for evaluating recordings representing time periods in relation to the actual time, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention and, therefore, such adaptations should and are intended to be comprehended within the meaning and range of equivalence of the folowing claims.

What is claimed as new and desired to be protected by Letters Patent is set forth in the appended claims.

We claim:

1. Apparatus for time-depending evaluation of at least one recording on a diagram carrier which has a start mark, said apparatus comprising support means for supporting said diagram carrier; scanning means for scanning said recording and said start mark, and producing a start signal when sensing said start mark; clock motor means for moving said support means with said diagram carrier, and said scanning means relative to each other at a predetermined constant speed; a pulse generator driven by said motor means at said constant speed to generate a predetermined number of time pulses during each time unit; a time counter for counting the time pulses generated by said pulse generator after said start signal, and counting up to a predetermined number of time pulses which corresponds to a predetermined time period; said scanning means producing different recognition signals when sensing distinguishable sections of said recording respectively representing the duration of different conditions; a plurality of storage counters respectively associated with said distinguishable sections of said recording; distributing circuit means connecting said scanning means with said storage counters and receiving said different recognition signals, respectively, and also said time pulses for storing said time pulses in different storage counters during successive time periods during which said scanning means sense said distinguishable sections of said recording; and means separately reading out said storage counters.

2. Apparatus as claimed in claim 1, wherein said start mark has a boundary defining a selected starting moment for the evaluation of said diagram carrier.

3. Apparatus as claimed in claim 1, wherein said starting mark is located outside of the area of said diagram carrier where said track is provided; and wherein said scanning means includes a sensor disposed to pass over said start mark during relative movement between said scanning means and said support means for producing said start signal.

4. Apparatus as claimed in claim 1, wherein said scanning means includes a recognition circuit for said start mark connected with a starting gate and producing said start signal for opening said starting gate when sensing said start mark.

5. Apparatus as claimed in claim 1, wherein said start mark has a shape different from any recording on said diagram carrier; wherein said scanning means include a sensing means responsive to said shape only to produce said start signal which is transmitted through said recognition circuit to said starting gate for opening the same.

6. Apparatus for time-depending evaluation of a recording on at least one track of a diagram carrier which has a start mark, said apparatus comprising support means for supporting said diagram carrier; scanning means for scanning said track and said start mark and producing a start signal when sensing said start mark; clock motor means for moving said support means with said diagram carrier, and said scanning means relative to each other in one direction at a predetermined constant speed; a pulse generator driven by said motor means at said constant speed to generate a predetermined number of time pulses during each time unit; a starting gate connected with said pulse generator and with said scanning means, and opening for the passage of said time pulses when receiving said start signal from said scanning means; a time counter for counting the time pulses passing through said opened starting gate after said start signal, and producing an end signal for closing said starting gate when a predetermined number of time pulses is connected which corresponds to a predetermined time period; a plurality of recognition circuits connected with said scanning means and producing different recognition signals when said scanning means successively sense distinguishable sections of said recording respectively representing the duration of different conditions; a plurality of storage counters associated with said distinguishable sections, respectively, of said recording; distributing gate means connecting said recognition circuits with said storage counters and receiving said different recognition signals, respectively, and also said time pulses from said starting gate for storing said time pulses in different storage counters during successive time periods during which said scanning means successively sense said distinguishable sections of said recording on said tracks; and read out means responsive to said end signal to separately read out from said storage counters the totals of the time pulses stored in said storage counters, respectively.

7. Apparatus as claimed in claim 6, wherein said diagram carrier is a rotary circular disk; and wherein said starting mark includes a radial line crossing a plurality of circular tracks of said diagram carrier on which recordings can be made.

8. Apparatus as claimed in claim 6, comprising a time limit gate connected between said scanning means and said starting gate and transmitting said start signal to said starting gate only during a short period of time after which said time limit gate closes so that no other marks on said diagram carrier can cause said scanning means to produce said starting signal.

9. Apparatus as claimed in claim 6, wherein said scanning means include sensing means for sensing the width and length of said start mark and producing said start signal only when sensing the correct width and length of said start mark.

10. Apparatus as claimed in claim 6, wherein said scanning means includes a row of sensors extending across the track of said recording transversely to said direction of movement, and in the same direction as said start mark when passing said start mark, said start mark having such a length that at least the two outermost sensors of said row both sense said start mark but not said recording; and further comprising an AND-gate connected with said outermost sensors and transmitting said start signal to said starting gate when both said outermost sensors sense said start mark.

11. Apparatus as claimed in claim 10, wherein all said sensors of said row sense said start mark; wherein said AND-gate is connected with all said sensors; and wherein said AND-gate produces said start signal when all said sensors sense said start mark.

12. Apparatus as claimed in claim 6, wherein said scanning means is stationary and said support means with said diagram carrier is rotated by said clock motor means; wherein said diagram carrier requires said predetermined time period for one revolution; wherein said start mark extends in radial direction for indicating the beginning of said predetermined time period; and wherein said scanning means has a row of sensors extending in radial direction for a radial distance corresponding to the radial length of said start mark so that at least the two outermost sensors of said row sense said start mark.

13. Apparatus as claimed in claim 12, including an AND-gate connected with at least said outermost sensors and transmitting the start signal to said starting gate when at least said two outermost sensors sense said start mark.

14. Apparatus as claimed in claim 12, wherein said predetermined number of pulses counted by said time counter represents the predetermined time period required for one revolution of said support means with said diagram carrier; and comprising a tabulating machine including said read out means and printing said totals of said storage counters, respectively.

15. Apparatus as claimed in claim 14, wherein said time counter includes means for setting said time counter to produce said end signal after counting different predetermined numbers of time pulses corresponding to different time periods required for one revolution of said support means with said diagram carrier.

16. Apparatus as claimed in claim 15, wherein said start mark has distinguishable mark portions on different diagram carriers which have different time periods for one revolution of said support means with said diagram carrier corresponding to different predetermined numbers of time pulses counted by said time counter for producing said end signal; and wherein said scanning means respond to said distinguishable mark portions to set said time counter to different predetermined numbers at which said end signal is produced.

17. Apparatus as claimed in claim 16, including a plurality of selector gates between said pulse generator and said starting gate respectively associated with different diagram carriers requiring said different time periods for one revolution; and wherein said scanning means include sensing means for sensing said distinguishable mark portions and transmitting signals to different selector gates when sensing different mark portions so that different selector gates are operative for setting said time counter to different predetermined numbers of time pulses at which said end signal is produced.

18. Apparatus as claimed in claim 6, wherein said diagram carrier has a plurality of tracks for a plurality of recordings; and wherein said start mark extends across all said tracks so that said start mark is sensed by said scanning means when scanning any one of said tracks.

19. Apparatus as claimed in claim 18, wherein said start mark includes coded mark portions sensed by said scanning means for setting said pulse generator and said time counter for operation with different diagram carriers requiring different time periods for one revolution corresponding to different predetermined numbers of time pulses at which said time counter produces said end signal.

20. Apparatus as claimed in claim 6, wherein said pulse generator is settable so that for any predetermined number of time pulses at which said time counter produces said end signal, the number of time pulses is the same for the same time unit irrespective of the angle of said diagram carrier representing said predetermined time period.

21. Apparatus as claimed in claim 20, wherein said pulse generator generates a plurality of series of time pulses at different frequencies, and including selector gates associated with said different frequencies and controlled by said scanning means sensing different start marks on different diagram carriers to permit transmission of time pulses at different frequencies to said time counter when different diagram carriers requiring different time periods for one revolution are mounted on said support means, respectively.

References Cited

UNITED STATES PATENTS

| 3,536,895 | 10/1970 | Dedden et al. | 235—61.6 A |
| 3,259,733 | 7/1966 | Klaver et al. | 235—61.6 A |
| 3,380,020 | 4/1968 | Clark | 235—92 T |

MAYNARD R. WILBUR, Primary Examiner

J. M. THESZ, Assistant Examiner

U.S. Cl. X.R.

235—92 DP, 92 R, 92 DN; 346—33 A; 235—61.6 A